United States Patent
Guo (10) Patent No.: US 9,407,091 B2
(45) Date of Patent: Aug. 2, 2016

(54) CONNECTION DEVICE WITH ELECTROSTATIC DISCHARGE PROTECTION

(71) Applicant: Wistron Corporation, New Taipei (TW)

(72) Inventor: Janhong Guo, New Taipei (TW)

(73) Assignee: Wistron Corporation, New Taipei (TW)

( * ) Notice: Subject to any disclaimer, the term of this patent is extended or adjusted under 35 U.S.C. 154(b) by 39 days.

(21) Appl. No.: 13/913,519

(22) Filed: Jun. 10, 2013

(65) Prior Publication Data

US 2014/0118870 A1    May 1, 2014

(30) Foreign Application Priority Data

Oct. 26, 2012    (CN) .......................... 2012 1 0419306

(51) Int. Cl.
    *H02H 9/04*    (2006.01)
(52) U.S. Cl.
    CPC ..................... *H02H 9/046* (2013.01)
(58) Field of Classification Search
    USPC .......................................................... 345/204
    See application file for complete search history.

(56) References Cited

U.S. PATENT DOCUMENTS

| | | | | |
|---|---|---|---|---|
| 5,192,999 A * | 3/1993 | Graczyk et al. | ............... | 348/552 |
| 5,490,117 A * | 2/1996 | Oda | ................. | G01R 31/31715 |
| | | | | 365/189.16 |
| 5,953,191 A * | 9/1999 | Narita | ................. | H01L 27/0248 |
| | | | | 361/56 |
| 6,407,895 B1 * | 6/2002 | Capps | ............................. | 361/56 |
| 6,459,707 B1 * | 10/2002 | Becker | .......................... | 370/537 |
| 6,642,939 B1 * | 11/2003 | Vallone et al. | ................. | 715/721 |
| 6,756,834 B1 * | 6/2004 | Tong | ................... | H01L 27/0251 |
| | | | | 327/309 |
| 7,277,104 B2 * | 10/2007 | Dickens | .................. | G06F 3/023 |
| | | | | 327/161 |
| 7,774,523 B2 * | 8/2010 | Chen et al. | ....................... | 710/62 |
| 7,917,247 B2 * | 3/2011 | Kachnic et al. | ............... | 700/245 |
| 7,965,480 B2 * | 6/2011 | Crawley et al. | .................. | 361/56 |
| 8,041,873 B2 * | 10/2011 | Chu | ............................... | 710/313 |
| 8,176,214 B2 * | 5/2012 | Jones et al. | ...................... | 710/14 |
| 8,489,784 B2 * | 7/2013 | Jones | .............................. | 710/65 |
| 8,648,609 B2 * | 2/2014 | Shi | ......................... | H04N 17/04 |
| | | | | 324/555 |
| 8,797,142 B2 * | 8/2014 | Koyama | .............. | H04W 52/028 |
| | | | | 340/10.1 |

(Continued)

FOREIGN PATENT DOCUMENTS

TW    200809654    2/2008

OTHER PUBLICATIONS

Office action mailed on Jun. 12, 2015 for the China application No. 201210419306.1, p. 3 line 4-39.

(Continued)

*Primary Examiner* — Thienvu Tran
*Assistant Examiner* — Angela Brooks
(74) *Attorney, Agent, or Firm* — Winston Hsu; Scott Margo (57) ABSTRACT

A connection device with electrostatic discharge protection includes a first interface including a plurality of signal pins for electrically connecting to a first electronic device, a second interface including a plurality of signal pins for electrically connecting to a second electronic device, a driving circuit coupled to a first signal pin of the plurality of signal pins of the first interface for generating a control signal according to a signal of the first signal pin, and a switch circuit coupled to the first interface, the second interface, and the driving circuit for controlling a conduction situation between the plurality of signal pins of the first interface and the plurality of signal pins of the second interface.

17 Claims, 6 Drawing Sheets

(56) References Cited

U.S. PATENT DOCUMENTS

| | | | | |
|---|---|---|---|---|
| 8,837,237 | B2* | 9/2014 | Kim | 365/191 |
| 8,908,345 | B2* | 12/2014 | Furuta | H01L 23/62 257/723 |
| 2003/0188049 | A1* | 10/2003 | Dickens | 710/8 |
| 2005/0212789 | A1* | 9/2005 | Kim | G09G 5/006 345/204 |
| 2006/0152525 | A1* | 7/2006 | Woog | 345/589 |
| 2007/0074284 | A1* | 3/2007 | Woog | G06F 21/84 726/16 |
| 2007/0077819 | A1* | 4/2007 | Thomson et al. | 439/620.01 |
| 2008/0092043 | A1* | 4/2008 | Trethewey | 715/705 |
| 2008/0146265 | A1* | 6/2008 | Valavi | 455/550.1 |
| 2009/0157917 | A1* | 6/2009 | Noh | H04N 5/268 710/38 |
| 2009/0200871 | A1* | 8/2009 | Luck et al. | 307/80 |
| 2010/0061027 | A1 | 3/2010 | Jiang | |
| 2010/0328849 | A1* | 12/2010 | Ewing | G06F 1/266 361/622 |
| 2011/0004716 | A1* | 1/2011 | Staal et al. | 710/301 |
| 2012/0074794 | A1* | 3/2012 | Morales | G06F 1/26 307/147 |
| 2012/0162836 | A1* | 6/2012 | Furuta | H01L 23/62 361/56 |
| 2013/0044083 | A1* | 2/2013 | Basnett et al. | 345/179 |
| 2013/0050084 | A1* | 2/2013 | Soffer | 345/163 |
| 2013/0109317 | A1* | 5/2013 | Kikuchi et al. | 455/41.2 |
| 2013/0218497 | A1* | 8/2013 | Stanlake | H02J 3/26 702/65 |
| 2014/0121787 | A1* | 5/2014 | Yamazaki et al. | 700/19 |

OTHER PUBLICATIONS

Office action mailed on Mar. 5, 2015 for the Taiwan application No. 101142201, filing date: Nov. 13, 2012, p. 1 line 12-14, p. 2-5 and p. 6 line 1-17

* cited by examiner

CONNECTION DEVICE WITH ELECTROSTATIC DISCHARGE PROTECTION

BACKGROUND OF THE INVENTION

1. Field of the Invention

The present invention relates to a connection device with electrostatic discharge protection, and more particularly, to a connection device capable of avoiding electrostatic discharge to damage related electric devices.

2. Description of the Prior Art

A monitor utilizes a transmission interface to connect with a video signal generating device for receiving and displaying video signals. The specifications of the transmission interface are broadly divided into an analog type such as a video graphics array (VGA) specification, and a digital type such as a digital video interface (DVI) specification, a high-definition multimedia interface (HDMI) specification, and etc. The different interface specifications provide corresponding signal pins (such as a clock signal pin, a data signal pin, a ground signal pin, and etc.) to realize communications and transmissions between the monitor and the video signal generating device.

However, when the video signal generating device starts to communicate with the monitor, if the monitor, under a special operating environment, cannot properly release charges, the monitor may have a very high voltage (such as 90V) due to the accumulated charges caused by the power-up or other reasons. At this moment, the electrostatic charges of the monitor may be discharged to the video signal generating device via a signal pin, such that the video signal generating device is damaged by a large current caused by the high voltage (e.g. 90V). The situation is easier to occur in a factory production line for testing the monitor. Since an operator often requires plugging in the monitor for testing, when the monitor is not connected properly and a ground line is opened, the very expensive test instrument (i.e. the video signal generating device) is easily burned by the large current due to the electrostatic discharge.

In order to solve the burned problem of the test instrument due to the electrostatic discharge, the prior art utilizes an isolation amplifier to sense a voltage drop produced by a external large current flowing through a external resistor and safely outputs a smaller voltage on the other side of the isolation amplifier. However, the prior art can not ensure that the test instrument may not be burned by the smaller voltage. Therefore, the prior art still does not achieve a complete isolation effect to protect against the electrostatic discharge. Thus, there is a need for improvement of the prior art.

SUMMARY OF THE INVENTION

It is therefore an objective of the present invention to provide a connection device with electrostatic discharge protection capable of achieving a complete isolation effect to improve the disadvantage of the prior art.

The present invention discloses a connection device with electrostatic discharge protection comprising a first interface having a plurality of signal pins for electrically connecting to a first electronic device, a second interface having a plurality of signal pins for electrically connecting to a second electronic device, a driving circuit coupled to a first signal pin of the plurality of signal pins of the first interface for generating a control signal according to a signal of the first signal pin, and a switch circuit coupled to the first interface, the second interface, and the driving circuit for controlling a conduction situation between the plurality of signal pins of the first interface and the plurality of signal pins of the second interface.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
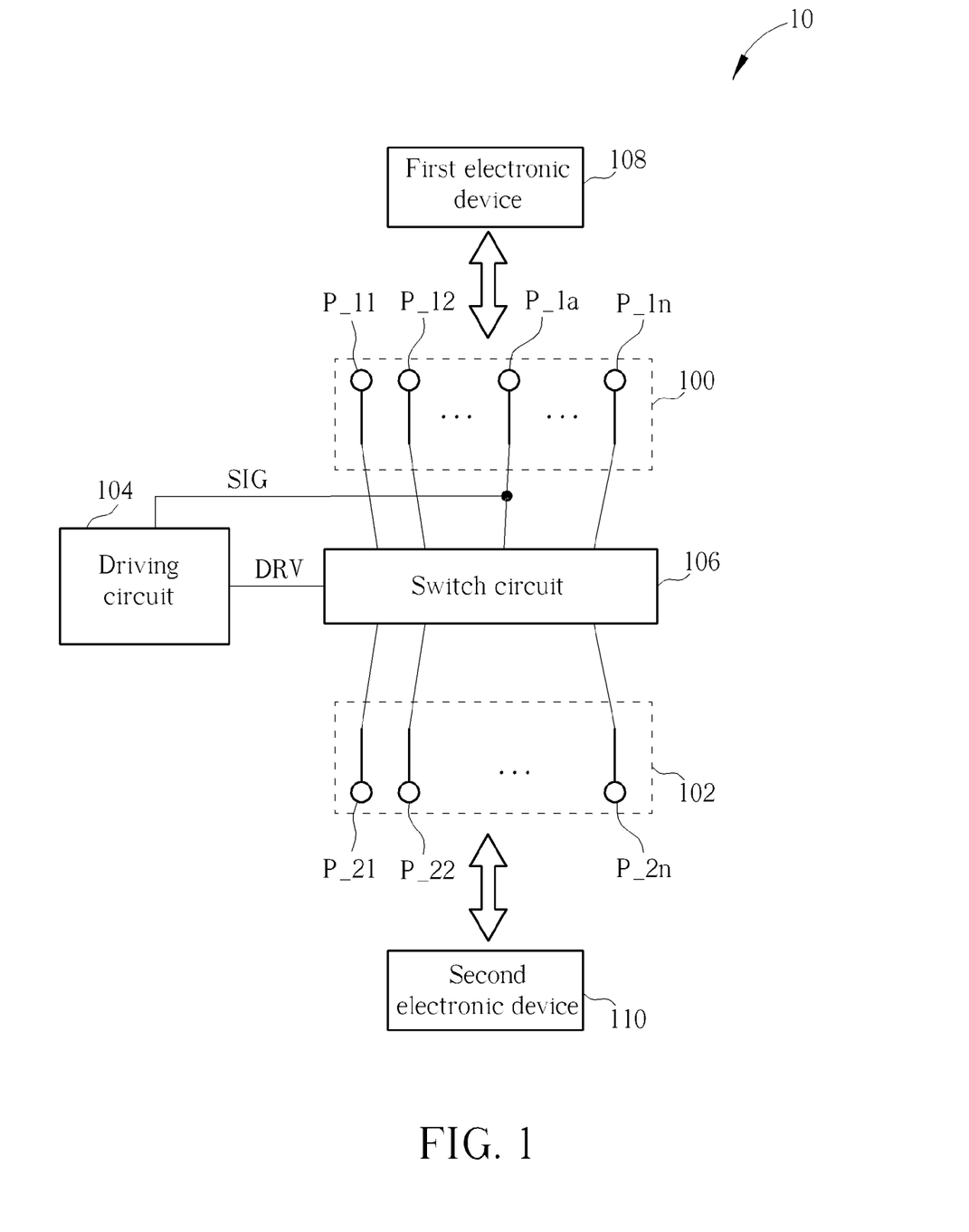
FIG. 1 illustrates a schematic diagram of a connection device according to an embodiment of the present invention.

Please refer to FIG. 1, which illustrates a schematic diagram of a connection device 10 according to an embodiment of the present invention. The connection device 10 is with an electrostatic discharge protection function which is capable of achieving a complete isolation effect. As shown in FIG. 1, the connection device 10 includes a first interface 100, a second interface 102, a driving circuit 104 and a switch circuit 106. The first interface 100 includes signal pins $P\_11$~$P\_1n$ for electrically connecting to a first electronic device 108 (i.e. a monitor). The second interface 102 includes signal pins $P\_21$~$P\_2n$ for electrically connecting to a second electronic device 110 (i.e. a video signal generating device). The first interface 100 and the second interface 102 are according to a digital or an analog transmission interface specification, such as a digital visual interface (DVI) specification, a high definition multimedia interface (HDMI) specification, a video graphics array (VGA) specification, or etc. The driving circuit 104 is coupled to a signal pin $P\_1a$ among the signal pins $P\_11$~$P\_1n$ of the first interface 100 for generating a control signal DRV according to a signal SIG of the signal pin $P\_1a$. The switch circuit 106 is coupled to the first interface 100, the second interface 102, and the driving circuit 104 for controlling a conduction situation between the signal pins $P\_11$~$P\_1n$ of the first interface 100 and the signal pins $P\_21$~$P\_2n$ of the second interface 102 according to the control signal DRV.

In short, the connection device 10 controls the driving circuit 104 to generate the control signal DRV according to the signal SIG of the signal pin $P\_1a$ transmitted from the first electronic device 108, so as to drive the switch circuit 106 controlling the conduction situation between the first interface 100 and the second interface 102. In other words, when the first electronic device 108 is not properly connected to the first interface 100 or the first electronic device 108 is not yet started, the signal pins $P\_1a$ does not have the signal SIG. Then, the switch circuit 106 disconnects the first interface 100 and the second interface 102 for completely isolating the first interface 100 and the second interface 102, so as to avoid the second electronic device 110 being damaged due to the electrostatic discharge from the first electronic device 108. Next, when the first interface 100 and the second interface 102 are properly connected to the first electronic device 108 and the first electronic device 108 starts to operate, the first electronic device 108 transmits the signal SIG through the signal pin $P\_1a$. Thus, the drive circuit 104 is triggered to drive the switching circuit 106 connecting the first interface 100 and second interface 102. As can be seen, the connection device 10 utilizes the signal pin P_1a of the first interface 100 to notify the driver circuit 104 for controlling the conduction situation of the switch circuit 106 via, so as to avoid the two electronic devices at the two interface terminals being damaged due to the electrostatic discharge.

Note that, FIG. 1 is an embodiment of the present invention. Those skilled in the art can make modifications or alterations accordingly. For example, the selection of the signal pins P_1a is not limited to a specific rule, and any signal pin, which is capable of indicating the connected situation of the first interface 100 to accordingly control the driving circuit 104 to completely disconnect or timely connect the two interfaces, is applied to the present invention. For example, in one embodiment, the first interface 100 and second interface 102 of the connecting device 10 are according to the DVI specification, the first electronic device 108 is a monitor having a interface according to the DVI specification, and the second electronic device 110 is a test instrument. In such a condition, the signal pin P_1a is a clock signal pin of the DVI specification, that is, the signal SIG is a clock signal. The clock signal is not transmitted through the clock signal pin when the first electronic device 108 is not yet connected to the first interface 100 or the first electronic device 108 is not started. Then, when the first electronic device 108 is properly connected to the first interface 100, the clock signal starts to be transmitted through the clock signal pin. Thereby, the drive circuit 104 may disconnect the first interface 100 and the second interface 102 when the first electronic device 108 is not started or not properly connected. Thus, the complete isolation effect is achieved to avoid the second electronic device 110 (i.e. the test instrument) being burned due to the instant high voltage electrostatic discharge when the first electronic device 108 (i.e. the monitor) is not properly connected. Conversely, when the first electronic device 108 and the second electronic device 110 are properly connected to the first interface 100 and the second interface 102, the high voltage electrostatic charges of the first electronic device 108 can be released via a completely connected ground signal pin. Simultaneously, since the first electronic device 108 starts to transmit the clock signal, the signal pin P_1a (i.e. the clock signal pin of the DVI) of the first interface 100 has the signal, and the driver circuit 104 accordingly indicates the switch circuit 106 to connect the first interface 100 and the second interface 102. In such a condition, since the high voltage electrostatic charges of the first electronic device 108 are released through the ground signal pin before the conduction, the second electronic device 110 may avoid being damaged due to the electrostatic discharge.

In addition to utilizing the clock signal pin of the DVI specification as the signal pin P_1a, in other embodiments, the signal pin P_1a may also be another pin according to the DVI specification or the synchronous signal pin according to the VGA specification, and is not limited herein.

Furthermore, in order to ensure that the high voltage electrostatic charges of the first electronic device 108 may be completely released via the ground signal pin, a delay mechanism is required to be added in the switch circuit 106, that is, the switch circuit 106 connects the first interface 100 and the second interface 102 after a predetermined period (such as 1 ms).

Figure 2:
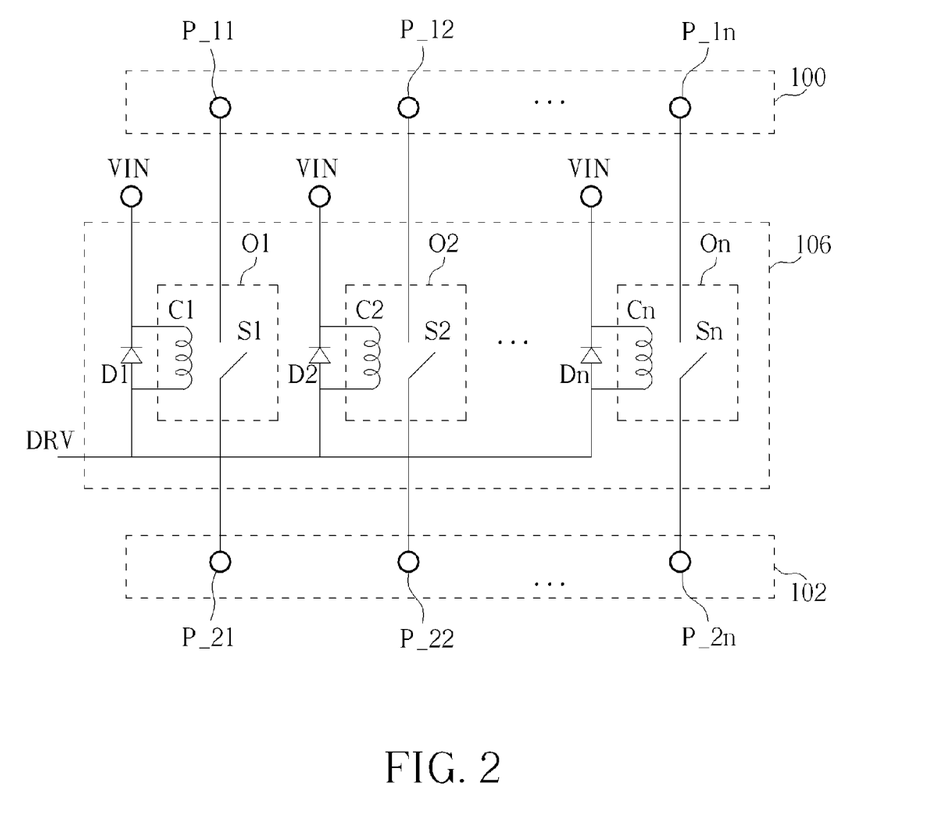
FIG. 2 illustrates a schematic diagram of a switch circuit according to an embodiment of the present invention.

Besides, the implementation of the switch circuit 106 is not limited as long as the switch circuit 106 can control the conduction situation between the first interface 100 and the second interface 102 according to the control signal DRV. For example, please refer to FIG. 2, which illustrates a schematic diagram of the switch circuit 106 according to an embodiment of the present invention. As shown in FIG. 2, the switch circuit 106 includes diodes D1~Dn and relays O1~On. Each of the relays O1~On is connected between a signal pin (among P_11~P_1n) of the first interface 100 and a signal pin (among P_21~P_2n) of the second interface 102, and is composed of a coil (labeled as C1~Cn) and a switch (labeled as S1~Sn) for driving the coil (C1~Cn) to control the conduction of the switch (among S1~Sn) according to the control signal DRV generated by the driving circuit 104, so as to control the conduction between the signal pins P11~P1n of the first interface 100 and the signal pins P21~P2n of the second interface 102. The terminals of the diodes D1~Dn are coupled to a system voltage VIN and the control signal DRV generated by the driving circuit 104, and are also respectively coupled to the terminals of the coils C1~Cn of the relays O1~On in parallel. The diodes D1~Dn are mainly utilized to protect other components from damage due to the reverse voltage generated by the coils C1~Cn when the relays O1~On are turning on or turning off. Furthermore, the relays O1~On may be selected properly to achieve the delay mechanism described as above, that is, the relays O1~On are conducted after the predetermined time (such as 1 ms). Note that, the diodes D1~Dn are reserved as the protection elements, and may also be omitted or replaced with other protection elements in some embodiments.

Figure 3A:
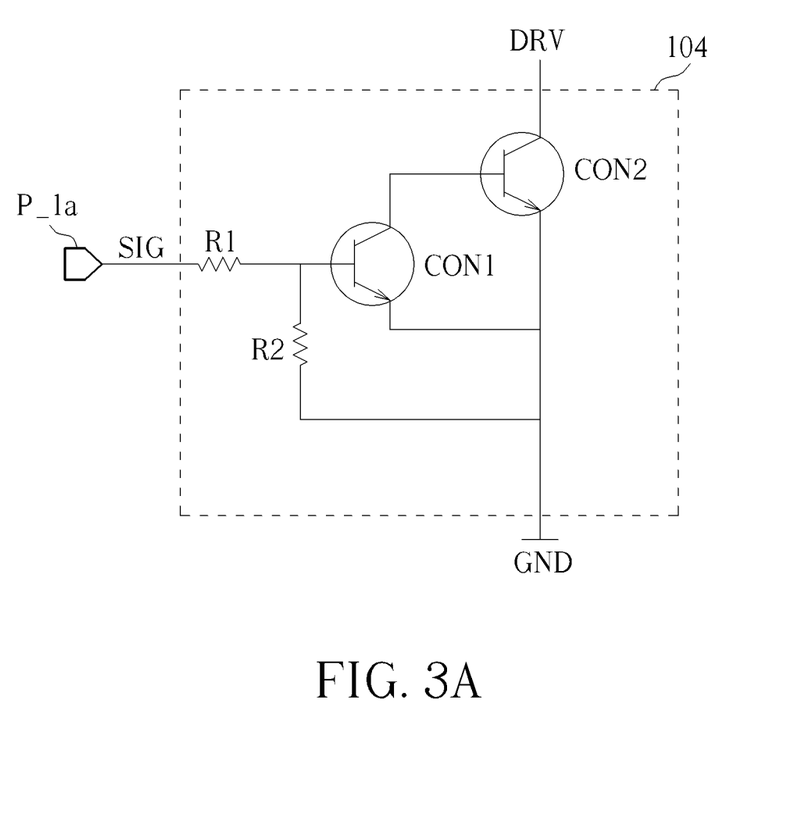
FIG. 3A~3D illustrate schematic diagrams of driver circuits according to the different embodiments of the present invention.

Moreover, the realization of the drive circuit 104 is not limited to a particular device or component. For example, please refer to FIG. 3A~3D, which illustrate schematic diagrams of the driver circuit 104 according to the different embodiments of the present invention. FIG. 3A~3D are the applications of the dividing voltage circuit and the amplifiers commonly known in industry. The operating method is familiar to those skilled in the art, so will be only briefly described as follows. As shown in FIG. 3A, the driving circuit 104 comprises resistors R1, R2 and transistors CON1, CON2. The resistors R1, R2 are connected in series between the signal pin P_1a and a ground terminal GND, and form pull-down dividing voltage resistors to correctly drive the transistor CON1. The transistors CON1, CON2 form the common-emitter amplifier in a cascaded manner, and generate the control signal DRV (from the collector of the second transistor CON2) according to the dividing voltage of the signal SIG, so as to drive the switching circuit 106.

Figure 3B:
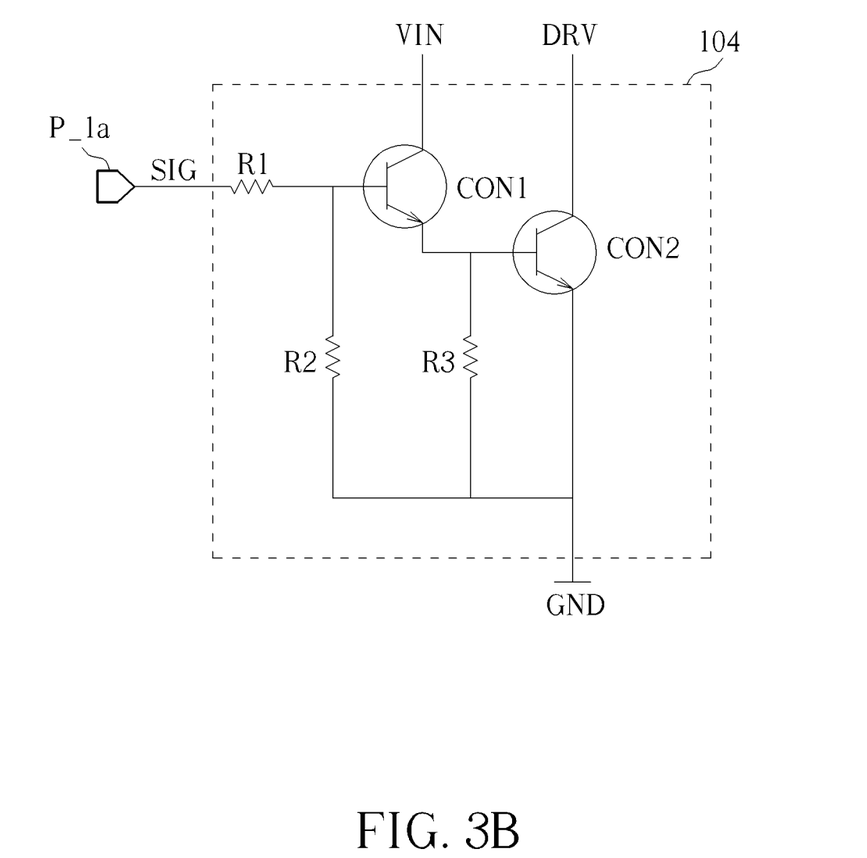
Figure 3C:
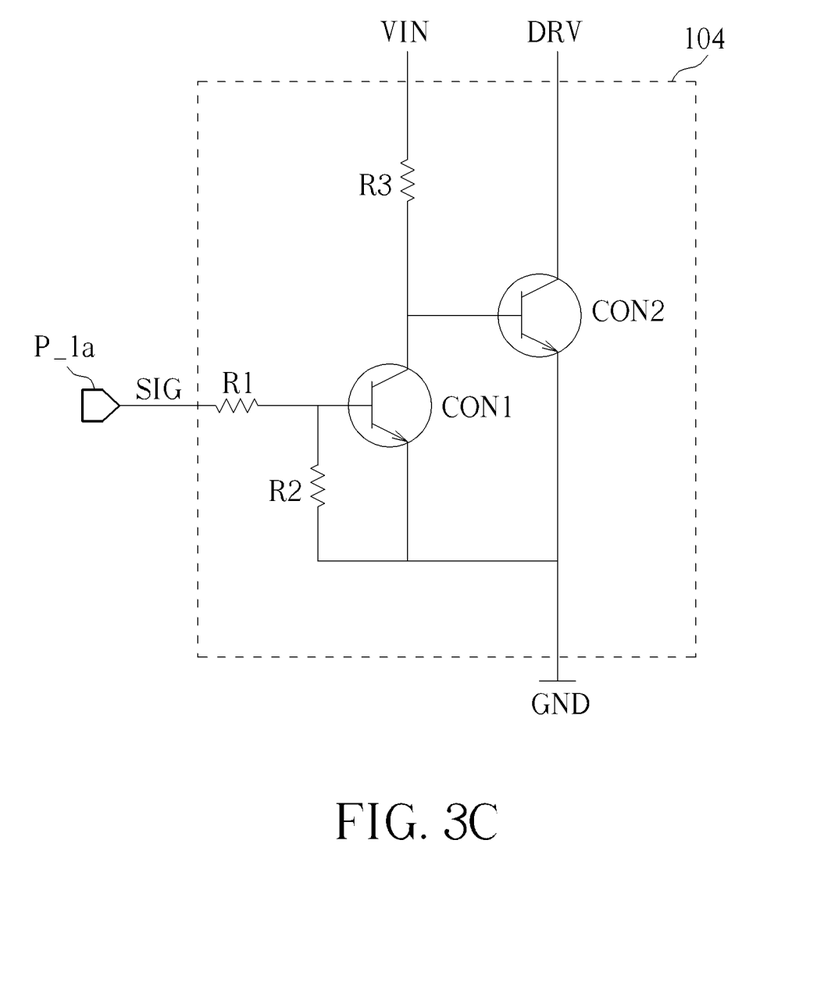

The embodiments in FIGS. 3B and 3C utilize transistor architectures and connection methods different from FIG. 3A, and similarly utilize the pull-down dividing voltage resistors R1, R2 to perform division of the voltage of the signal SIG for triggering the transistor CON1 to be turned on stably. The main difference is that a pull-down resistor (a resistor R3 in FIG. 3B) or a pull-up resistor (a resistor R3 in FIG. 3C) is added between the transistors CON1, CON2, such that the voltage level may be more stable and the reaction speed is quicker. Noticeably, the transistors CON1, CON2 in FIGS. 3A, 3B and 3C are each an N-type bipolar junction transistor (BJT), but an N-type BJT and a metal oxide semiconductor (MOS) transistor or both MOS transistors may also be utilized. Those skilled in the art can make modifications or alterations accordingly and is not limited herein.

Figure 3D:
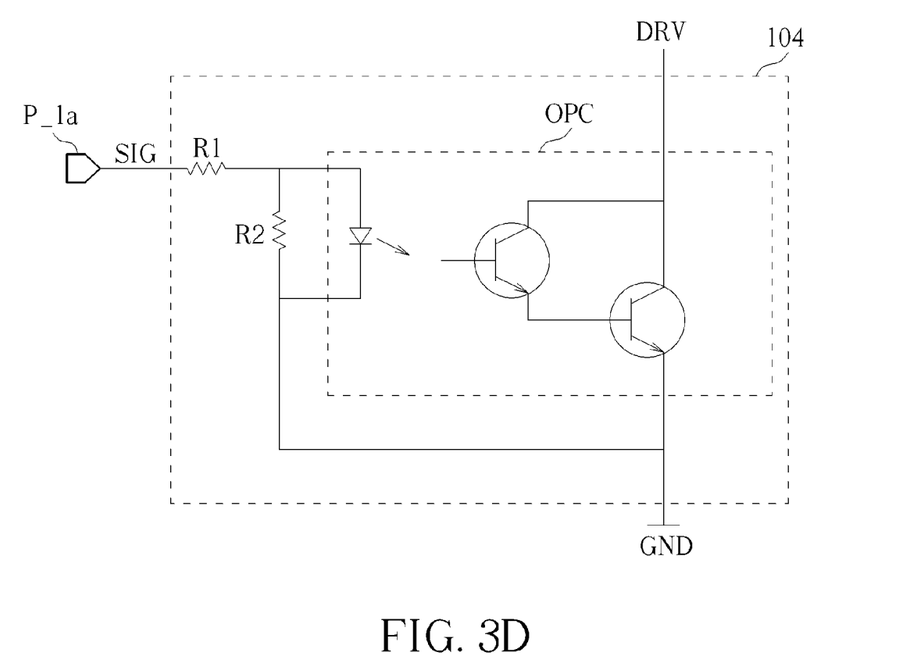

The main difference between the embodiment in FIG. 3D and in FIG. 3A~3C is that the common-emitter directly coupled amplifier (the transistors CON1 and CON2) is replaced by an optical amplifier OPC. Similarly, the optical amplifier OPC may generate the control signal DRV to drive the switch circuit 106 according to the signal SIG.

In order to solve the problem of burning the test instrument due to the electrostatic discharge, the prior art utilizes an isolation amplifier to sense a voltage drop produced by a external large current flowing through a external resistor and safely outputs a smaller voltage on the other side of the isolation amplifier. However, the prior art can not ensure that the test instrument may not be burned by the smaller voltage. In comparison, the embodiments of the present invention determine whether the first interface 100 is properly connected with the first electronic device 108 according to the signal SIG of the signal pin P_1a, and connects the first interface 100 and the second interface 102 after the high voltage electrostatic charges of the first electronic device 108 are completely released after a period. As a result, the damage due to the electrostatic discharge of the electronic devices at the both interface terminals may be avoided.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A connection device with electrostatic discharge protection, comprising:
    a first interface comprising a plurality of signal pins for electrically connecting to a first electronic device;
    a second interface comprising a plurality of signal pins for electrically connecting to a second electronic device, wherein the plurality of signal pins of the second interface correspond to the plurality of signal pins of the first interface;
    a driving circuit coupled to a first signal pin of the plurality of signal pins of the first interface, configured to generate a control signal according to whether a signal is present on the first signal pin; and
    a switch circuit coupled to the first interface, the second interface, and the driving circuit, being controlled by the driving circuit to control a conduction situation between the plurality of signal pins of the first interface and the plurality of signal pins of the second interface, wherein the switch circuit comprises a plurality of relays, and each relay corresponding to a signal pin of the first interface and a signal pin of the second interface is utilized for controlling a conduction situation between the signal pin of the first interface and the signal pin of the second interface according to the control signal generated by the driving circuit.

2. The connection device of claim 1, wherein the first electronic device is a monitor and the second electronic device is a video signal generating device.

3. The connection device of claim 2, wherein the first interface and the second interface are according to a digital visual interface (DVI) specification.

4. The connection device of claim 3, wherein the first signal pin is a clock signal pin.

5. The connection device of claim 2, wherein the first interface and the second interface are according to a video graphics array (VGA) specification.

6. The connection device of claim 1, wherein the driving circuit controls the switch circuit to disconnect the plurality of signal pins of the first interface and the plurality of signal pins of the second interface through the control signal when the first signal pin has no signal, and the driving circuit controls the switch circuit to connect the plurality of signal pins of the first interface and the plurality of signal pins of the second interface through the control signal when the first signal pin has a signal.

7. The connection device of claim 6, wherein the switch circuit connects the plurality of signal pins of the first interface and the plurality of signal pins of the second interface after a predefine period according to the control signal when the first signal pin has a signal.

8. The connection device of claim 1, wherein the switch circuit further comprises a plurality of protection components for protecting the plurality of relays.

9. The connection device of claim 1, wherein the driving circuit comprises:
    a first resistor comprising a first terminal and a second terminal, the first terminal of the first resistor coupled to the first signal pin;
    a second resistor comprising a first terminal coupled to a ground terminal and a second terminal coupled to the second terminal of the first resistor;
    a first transistor comprising a first terminal, a second terminal, and a control terminal, the first terminal of the first transistor coupled to the ground terminal, and the control terminal of the first transistor coupled between the second terminal of the first resistor and the second terminal of the second resistor; and
    a second transistor, comprising a first terminal coupled to the ground terminal, a second terminal coupled to the switch circuit, and a control terminal coupled to the second terminal of the first transistor.

10. The connection device of claim 9, wherein the first transistor and the second transistor are each an N-type bipolar junction transistor (BJT) and the first terminal, the second terminal, and the control terminal of the first transistor and the second transistor are respectively an emitter, a collector, and a base.

11. The connection device of claim 9, wherein the first transistor and the second transistor are each an N-type metal oxide semiconductor (MOS) transistor and the first terminal, the second terminal and the control terminal of the first transistor and the second transistor are respectively a source, a drain and a gate.

12. The connection device of claim 1, wherein the driving circuit comprises:
    a first resistor comprising a first terminal and a second terminal, the first terminal of the first resistor coupled to the first signal pin;
    a second resistor comprising a first terminal coupled to a ground terminal and a second terminal coupled to the second terminal of the first resistor;
    a third resistor comprising a first terminal and a second terminal, the first terminal of the third resistor coupled to the ground terminal;
    a first transistor comprising a first terminal, a second terminal, and a control terminal, the first terminal of the first transistor coupled to the second terminal of the third resistor, the second terminal of the first transistor coupled to a system voltage, and the control terminal of the first transistor coupled between the second terminal of the first resistor and the second terminal of the second resistor; and
    a second transistor comprising a first terminal coupled to the ground terminal, a second terminal coupled to the switch circuit, and a control terminal coupled between the first terminal of the first transistor and the second terminal of the third resistor.

13. The connection device of claim 12, wherein the first transistor and the second transistor are each an N-type bipolar junction transistor (BJT) and the first terminal, the second terminal, and the control terminal of the first transistor and the second transistor are respectively an emitter, a collector and a base.

14. The connection device of claim 12, wherein the first transistor and the second transistor are each an N-type metal oxide semiconductor (MOS) transistor and the first terminal, the second terminal, and the control terminal of the first transistor and the second transistor are respectively a source, a drain, and a gate.

15. The connection device of claim 1, wherein the driving circuit comprises:
   a first resistor comprising a first terminal, and a second terminal, the first terminal of the first resistor coupled to the first signal pin;
   a second resistor comprising a first terminal coupled to a ground terminal and a second terminal coupled to the second terminal of the first resistor;
   a third resistor comprising a first terminal and a second terminal, the first terminal of the third resistor coupled to a system voltage;
   a first transistor comprising a first terminal, a second terminal, and a control terminal, the first terminal of the first transistor coupled to the ground terminal, the second terminal of the first transistor coupled to the second terminal of the third resistor, and the control terminal of the first transistor coupled between the second terminal of the first resistor and the second terminal of the second resistor; and
   a second transistor, comprising a first terminal coupled to the ground terminal, a second terminal coupled to the switch circuit, and a control terminal coupled between the second terminal of the first transistor and the second terminal of the third resistor.

16. The connection device of claim 15, wherein the first transistor and the second transistor are each an N-type bipolar junction transistor (BJT) and the first terminal, the second terminal, and the control terminal of the first transistor and the second transistor are respectively an emitter, a collector and a base.

17. The connection device of claim 15, wherein the first transistor and the second transistor are each an N-type metal oxide semiconductor (MOS) transistor and the first terminal, the second terminal, and the control terminal of the first transistor and the second transistor are respectively a source, a drain, and a gate.

* * * * *